US008674253B2

(12) United States Patent
Uchii et al.

(10) Patent No.: US 8,674,253 B2
(45) Date of Patent: Mar. 18, 2014

(54) GAS INSULATION APPARATUS

(75) Inventors: Toshiyuki Uchii, Kanagawa (JP);
Amane Majima, Kanagawa (JP);
Toshiyuki Nakano, Kanagawa (JP);
Yoshihiko Hirano, Tokyo (JP); Akira Shimamura, Kanagawa (JP); Yoshikazu Hoshina, Kanagawa (JP)

(73) Assignee: Kabushiki Kaisha Toshiba, Tokyo (JP)

(*) Notice: Subject to any disclaimer, the term of this patent is extended or adjusted under 35 U.S.C. 154(b) by 176 days.

(21) Appl. No.: 13/325,106

(22) Filed: Dec. 14, 2011

(65) Prior Publication Data
US 2012/0085735 A1 Apr. 12, 2012

Related U.S. Application Data

(63) Continuation-in-part of application No. PCT/JP2010/003954, filed on Jun. 15, 2010.

(30) Foreign Application Priority Data

Jun. 17, 2009 (JP) ................................. 2009-144383

(51) Int. Cl.
*H01H 33/88* (2006.01)
(52) U.S. Cl.
USPC ................... 218/59; 218/63; 218/79; 218/84
(58) Field of Classification Search
USPC .................... 218/57–59, 84, 63, 79
See application file for complete search history.

(56) References Cited

U.S. PATENT DOCUMENTS

| 3,824,360 | A | * | 7/1974 | Slamecka et al. ............... 218/63 |
| 3,857,006 | A | * | 12/1974 | Daimon et al. ................ 218/84 |
| 4,027,126 | A | * | 5/1977 | Grunert ......................... 218/79 |
| 4,069,166 | A | * | 1/1978 | Masunaga et al. ............. 585/6.6 |
| 4,236,053 | A | * | 11/1980 | Sasaki et al. ..................... 218/57 |
| 4,315,119 | A | * | 2/1982 | Kishi et al. ......................... 218/4 |
| 4,486,634 | A | * | 12/1984 | Nakano et al. ................. 218/55 |
| 4,835,648 | A | * | 5/1989 | Yamauchi ....................... 361/14 |
| 6,515,248 | B2 | * | 2/2003 | Imamura et al. ................ 218/59 |
| 6,888,116 | B2 | * | 5/2005 | Dalton ........................... 219/745 |

FOREIGN PATENT DOCUMENTS

| CN | 1926059 A | 3/2007 |
| JP | 11-290638 A | 10/1999 |
| JP | 2003-286012 | 10/2003 |
| JP | 2007-258137 | 10/2007 |
| JP | 2007-300716 A | 11/2007 |
| JP | 2008-084768 A | 4/2008 |
| JP | 2009-266662 A | 11/2009 |
| JP | 2009-289566 | 12/2009 |

OTHER PUBLICATIONS

International Search Report issued on Jul. 20, 2010 for PCT/JP10/003954 filed on Jun. 15, 2010 (English translation).

(Continued)

Primary Examiner — Truc Nguyen
(74) Attorney, Agent, or Firm — Oblon, Spivak, McClelland, Maier & Neustadt, L.L.P.

(57) ABSTRACT

According to an embodiment, a gas insulation apparatus (e.g., a gas circuit breaker) includes a high-voltage unit, a zeolite and an insulation gas in a closed vessel. The insulation gas is $CO_2$ gas or a gas including $CO_2$ gas as the main component. The zeolite is contained in a zeolite case and is placed under an insulation gas atmosphere. $CO_2$ is adsorbed on the zeolite before use of the gas insulation apparatus.

24 Claims, 5 Drawing Sheets

(56) References Cited

OTHER PUBLICATIONS

Microfilm of the specification and drawings annexed to the request of Japanese Utility Model Application No. 128268/1980 (Laid-open No. 50834/1982) (Nissin Electric Co., Ltd.), Mar. 24, 1982, entire text; drawings.

International Preliminary Report on Patentability and Written Opinion issued Jan. 26, 2012, in PCT/JP2010/003954 filed Jun. 15, 2010.
Office Action mailed Nov. 5, 2013, in Chinese Patent Application No. 201080026758.2.

* cited by examiner

GAS INSULATION APPARATUS

CROSS REFERENCES TO RELATED APPLICATIONS

This application is a continuation-in-part (CIP) application based upon the International Application PCT/JP2010/003954, the International Filing Date of which is Jun. 15, 2010, the entire content of which is incorporated herein by reference, and is based upon and claims the benefits of priority from the prior Japanese Patent Application No. 2009-144383, filed in the Japanese Patent Office on Jun. 17, 2009, the entire content of which is incorporated herein by reference.

FIELD

Embodiments described herein relate to a gas insulation apparatus using an insulation gas containing $CO_2$.

BACKGROUND

A power transmission/transformation system includes a gas insulation transmitter/transformer apparatus (hereinafter, referred to as "gas insulation apparatus") such as a switchgear (such as a gas circuit breaker or a gas insulation disconnector), a gas insulation transformer, and a gas insulation pipe. A vessel of a gas insulation apparatus is filled with an insulation gas. The insulation gas serves as an electric insulation medium for preventing discharge between the vessel of the gas insulation apparatus and the electrical circuit in the vessel and as a cooling medium for suppressing temperature rise due to electric current. In addition, in a switchgear, the insulation gas serves as an arc-extinguishing medium for extinguishing arc discharge occurring at the switching operation. Currently, as an insulation gas filled in a high-voltage/large capacity gas insulation apparatus, a sulfur hexafluoride gas (hereinafter, referred to as "$SF_6$ gas") is widely used.

$SF_6$ gas is an inactive gas having considerably high stability and is harmless and noncombustible. Further, $SF_6$ gas is significantly excellent in the abovementioned insulation performance and the arc-extinguishing performance. Therefore, $SF_6$ gas is suitably used for a high voltage gas insulation apparatus, contributing to size reduction of the gas insulation apparatus. However, $SF_6$ gas has a global warming effect 23,900 times greater than $CO_2$ gas, so that the use of $CO_2$ gas as the insulation gas is now proposed.

As described above, accidental discharge may occur between the vessel and the electrical circuit at the time of use of the gas insulation apparatus. Further, in the switchgear, arc discharge may occur at the switching operation. It is known that when such discharge occurs, the insulation gas is changed into plasma to cause dissociation of the insulation gas molecules.

Even when the dissociation occurs due to discharge in the case where $SF_6$ gas is used as the insulation gas, the majority of the $SF_6$ molecules are recombined due to its high stability. It should be noted that there may be a case where a few sulfur (S) ions and a few fluorine (F) ions generated by the dissociation of the $SF_6$ molecules react with a small amount of water existing in the vessel to generate a very small amount of cracked gas such as HF or $SOF_2$ gas. However, the influence of the reaction is not strong enough to reduce the insulation performance, arc-extinguishing performance, and electric conducting performance of the gas insulation apparatus.

In the case where $CO_2$ gas is used as the insulation gas, some oxygen (O) ions generated by dissociation of $CO_2$ molecules react with metal constituting the most part of the gas insulation apparatus to generate CO molecules as a cracked gas without involving recombination. Thus, the amount of $CO_2$ gas filled in the vessel is gradually reduced, while the amount of CO gas as the cracked gas is increased. $CO_2$ gas is lower than $SF_6$ gas in terms of the ratio of recombination after dissociation due to discharge. Therefore, in the case where $CO_2$ gas is used as the insulation gas, the insulation performance or arc-extinguishing performance of the gas insulation apparatus is reduced with the use of the gas insulation apparatus more easily than in the case where $SF_6$ gas is used. This often requires maintenance of the gas insulation apparatus or replenishment of the insulation gas.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION

The embodiments described here have been made to solve the above problem, and an object thereof is to suppress a reduction in the insulation performance or arc-extinguishing performance in a gas insulation apparatus using an insulation gas containing $CO_2$.

According to an aspect of the present invention, a gas insulation apparatus includes a closed vessel, a high-voltage unit arranged inside the closed vessel, an insulation gas containing $CO_2$ filled in the closed vessel, and a zeolite arranged in the insulation gas.

First Embodiment

A first embodiment of a gas insulation apparatus according to the present invention will be described below with reference to FIGS. 1 to 4. A gas insulation apparatus according to the present embodiment is a puffer type gas circuit breaker.

Figure 1:
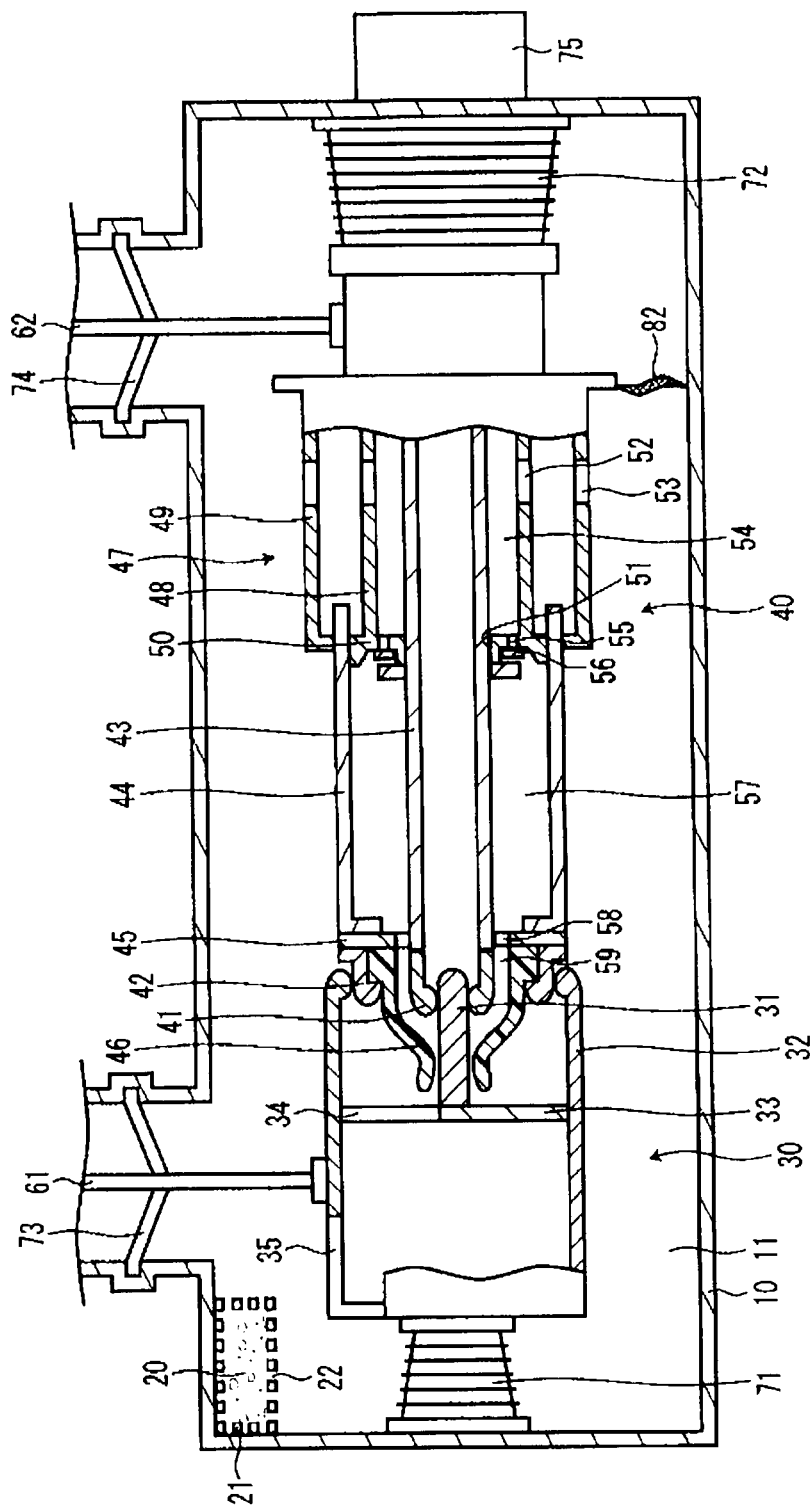
FIG. 1 is a partly schematic cross-sectional view of a gas insulation apparatus (gas circuit breaker) according to a first embodiment of the present invention, which illustrates a closed state of the gas circuit breaker.
Figure 2:
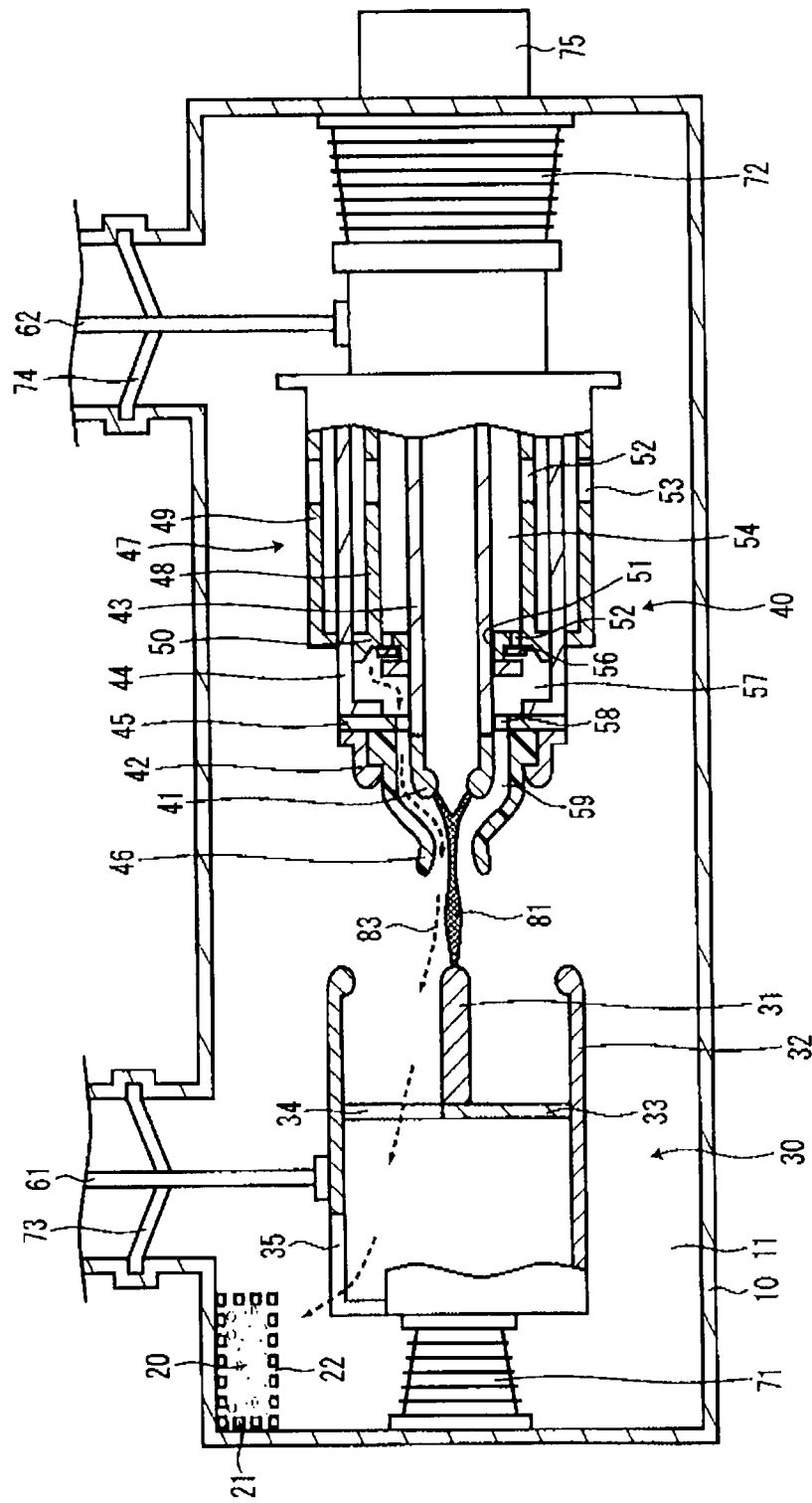
FIG. 2 is a partly schematic cross-sectional view of the gas insulation apparatus (gas circuit breaker) according to the first embodiment of the present invention, which illustrates a state where the gas circuit breaker is being opened.

A structure of the gas insulation apparatus (gas circuit breaker) according to the present embodiment will be described with reference to FIGS. 1 and 2. FIG. 1 is a partly schematic cross-sectional view of the gas insulation apparatus (gas circuit breaker) according to the present embodiment, which illustrates a closed state of the gas circuit breaker. FIG. 2 is a partly schematic cross-sectional view of the gas insulation apparatus (gas circuit breaker) according to the present embodiment, which illustrates a state where the gas circuit breaker is being opened.

The gas circuit breaker includes, in a closed vessel 10, a high-voltage unit, a zeolite 20, and an insulation gas.

The closed vessel 10 is formed into substantially a cylindrical shape. The closed vessel 10 is made of metal or insulator. The closed vessel 10 is grounded.

The gas insulation apparatus according to the present embodiment is a gas circuit breaker and has a function of shutting off large current applied in the high-voltage unit. In order to suppress discharge from the high-voltage unit to the closed vessel 10, the high-voltage unit is arranged in the closed vessel 10 away from the closed vessel 10 by an interval 11. The closed vessel 10 is filled with an insulation gas.

The high-voltage unit includes a fixed part 30, a movable part 40, and electric conductive parts 61 and 62.

The fixed part 30 and the movable part 40 are arranged along the axis of the closed vessel 10 so as to face each other. The fixed part 30 and the movable part 40 are fixed to the closed vessel 10 by supports 71 and 72 each made of an insulating body.

The electric conductive parts 61 and 62 are fixed to the closed vessel 10 by spacers 73 and 74 each made of an insulating body. The spacers 73 and 74 each also play a role of preventing the insulation gas filled in the closed vessel 10 from leaking outside.

In the closed state (FIG. 1) of the gas circuit breaker, large current flows into the gas circuit breaker through a bushing (not illustrated). The large current flows in the electric conductive part 61, the fixed part 30, the movable part 40, and the electric conductive part 62. After that, the large current flows out from the gas circuit breaker through a bushing (not illustrated).

The fixed part 30 includes a fixed arc contact 31, a fixed conductive contact 32, and a fixed conductive plate 33.

The fixed arc contact 31 is formed into a rod-like shape and extends along the axis of the closed vessel 10. The fixed conductive contact 32 is formed into a cylindrical shape and extends along the axis of the closed vessel 10 so as to surround the fixed arc contact 31. The fixed conductive plate 33 is formed into a plate-like shape and is arranged inside the fixed conductive contact 32 so as to extend perpendicular to the axis of the closed vessel 10. The fixed conductive plate 33 makes the fixed arc contact 31 and fixed conductive contact 32 conductive.

The movable part 40 includes a movable arc contact 41, a movable conductive contact 42, a driving rod 43, a puffer cylinder 44, a connecting plate 45, an insulation nozzle 46, a piston 47, and the like.

The driving rod 43 is formed into a cylindrical shape and extends along the axis of the closed vessel 10. The end portion of the driving rod 43 on the opposite side to the fixed part 30 is connected to a driving unit 75, and the driving rod 43 is moved in the axial direction (left-right direction of FIGS. 1 and 2) of the closed vessel 10 by a driving unit 75.

The movable arc contact 41 is formed into an annular shape and protrudes from the fixed part 30 side end portion of the driving rod 43 toward the fixed part 30. In the closed sate (FIG. 1), the inner peripheral surface of the movable arc contact 41 contacts the outer peripheral surface of the fixed arc contact 31.

The puffer cylinder 44 is formed into a cylindrical shape and extends along the axis of the closed vessel 10. The puffer cylinder 44 is arranged around the outer periphery of the driving rod 43 so as to be spaced apart from the driving rod 43. The connecting plate 45 is formed into a plate-like shape and extends, perpendicular to the axis of the closed vessel 10, from the fixed part 30 side end portion of the puffer cylinder 44 to the outer peripheral surface of the driving rod 43. The connecting plate 45 connects the driving rod 43 and the puffer cylinder 44.

The movable conductive contact 42 is formed into an annular shape and protrudes from the fixed part 30 side surface of the connecting plate 45 toward the fixed part 30. The movable conductive contact 42 is arranged around the outer periphery of the movable arc contact 41 so as to be spaced apart from the movable arc contact 41. In the closed state (FIG. 1), the outer peripheral surface of the movable conductive contact 42 contacts the inner surface of the fixed conductive contact 32.

The insulation nozzle 46 is formed into an annular shape and protrudes from the fixed part 30 side surface of the connecting plate 45 toward the fixed part 30. The insulation nozzle 46 is arranged between the movable arc contact 41 and the movable conductive contact 42. The insulation nozzle 46 is arranged spaced apart from the movable arc contact 41 and surrounds the outer periphery and distal end of the movable arc contact 41. The insulation nozzle 46 is an insulating body made of, e.g., fluorine resin such as polytetrafluoroethylene.

The above movable arc contact 41, the movable conductive contact 42, the driving rod 43, the puffer cylinder 44, the connecting plate 45, and the insulation nozzle 46 are integrally formed and thus are integrally moved in the axial direction (left-right direction of FIGS. 1 and 2) of the closed vessel 10 by the driving unit 75.

The piston 47 has a double-pipe structure composed of an inner pipe 48 and an outer pipe 49. The inner pipe 48 and the outer pipe 49 extend along the axis of the closed vessel 10 and are spaced apart from each other. The puffer cylinder 44 is slidably arranged between the inner pipe 48 and the outer pipe 49. A flange 50 extending toward the axial center of the closed vessel 10 is formed at the fixed part 30 side end portion of the inner pipe 48. A through hole 51 corresponding to the outer diameter of the driving rod 43 is formed in the flange 50. The driving rod 43 is inserted through the through hole 51 and arranged inside the inner pipe 48 so as to be spaced apart from the inner pipe 48. The driving rod 43 is slidable with respect to the piston 47.

A first communicating hole 52 and a second communicating hole 53 are formed respectively in the inner pipe 48 and the outer pipe 49. The insulation gas is filled in a space (hereinafter referred to "piston chamber") 54 surrounded by the driving rod 43, the inner pipe 48, and the flange 50 through the first and the second communicating holes 52 and 53.

A third communicating hole 55 is formed in the flange 50, and a check valve 56 is provided in the third communicating hole 55. Thus, a space (hereinafter referred to "cylinder chamber") 57 surrounded by the driving rod 43, the puffer cylinder 44, the flange 50, and the connecting plate 45 communicates with the piston chamber 54 through the third communicating hole 55 and the check valve 56. The insulation gas is prevented from flowing from the cylinder chamber 57 to the piston chamber 54 by the check valve 56, while when the inner pressure of the cylinder chamber 57 is lower than that of the piston chamber 54, the insulation gas flows from the piston chamber 54 to the cylinder chamber 57.

In the present embodiment, the insulation gas is $CO_2$ gas or a mixed gas mainly containing $CO_2$ gas (mixed gas in which the mass mixing ratio of $CO_2$ gas is 50% or more).

In the case where the insulation gas is the mixed gas mainly containing $CO_2$ gas, the gas other than $CO_2$ gas is preferably a gas having a non-polar molecular structure, such as $N_2$ gas, $O_2$ gas, or He gas. Alternatively, the gas other than $CO_2$ gas is preferably a gas having a larger molecular diameter than that of $CO_2$ gas, such as $CF_4$ gas.

The gas circuit breaker according to the present embodiment has, in the closed vessel 10, the zeolite 20 housed in a zeolite case 21. In the zeolite case 21, a bead-shaped or pellet-shaped zeolite of, e.g., several mm is housed. A large number of air holes 22 are formed in the zeolite case 21, and $CO_2$ gas filled in the closed vessel 10 contacts the zeolite in the zeolite case 21 through the air holes 22.

The zeolite case 21 is arranged above the high-voltage unit. Further, the zeolite case 21 is arranged in the flow passage (e.g., in the vicinity of a sixth communicating hole 35) of the insulation gas that has been blown to arc-discharge 81 to be described later.

The zeolite 20 is, e.g., synthetic zeolite and, particularly, synthetic zeolite having pore diameters between 0.2 nm and 0.5 nm (e.g., A-type zeolite) is preferably used.

Preferably, $CO_2$ molecules are adsorbed to the zeolite 20 in advance before use of the gas circuit breaker. For example, the gas circuit breaker according to the present embodiment is produced as follows. The high-voltage unit and zeolite case 21 are arranged at predetermined positions inside the closed vessel 10, and the closed vessel 10 is vacuumed. Subsequently, $CO_2$ gas is enclosed with high pressure in the closed vessel 10 to adsorb $CO_2$ gas to the zeolite 20. After that, predetermined insulation gas is filled in the closed vessel 10.

The opening operation of the gas insulation apparatus (gas circuit breaker) according to the present embodiment will be described with reference to FIGS. 1 and 2.

In the closed state (FIG. 1), the fixed arc contact 31 and the movable arc contact 41 contact each other, and the fixed conductive contact 32 and the movable conductive contact 42 contact each other, whereby electrical conduction is established between the fixed part 30 and the movable part 40.

To shut off current, the driving unit 75 is used to move the driving rod 43 in the direction (left direction of FIG. 1) away from the fixed part 30. Accordingly, the fixed arc contact 31 and the movable arc contact 41, as well as, the fixed conductive contact 32 and the movable conductive contact 42 are separated from each other. As a result, as illustrated in FIG. 2, arc discharge 81 is generated between the fixed arc contact 31 and the movable arc contact 41.

The puffer cylinder 44 is housed in the piston 47 in association with the opening operation, so that the volume of the cylinder chamber 57 is reduced. Then, the insulation gas filled in the cylinder chamber 57 passes through the fourth communicating hole 58 formed in the connecting plate 45 and a gap 59 between the movable arc contact 41 and the insulating nozzle 46 to be blown to the arc discharge 81. As a result, the arc discharge 81 loses its conductivity, whereby the current is shut off. In general, in order to obtain high arc-extinguishing performance, high blowing pressure and high flow rate of the insulation gas are required.

The insulation gas that has been blown passes through a fifth communicating hole 34 formed in the fixed conductive plate 33 and a sixth communicating hole 35 formed in the fixed conductive contact 32 for convection inside the closed vessel 10, as a flow passage 83 illustrated in FIG. 2.

Figure 3:
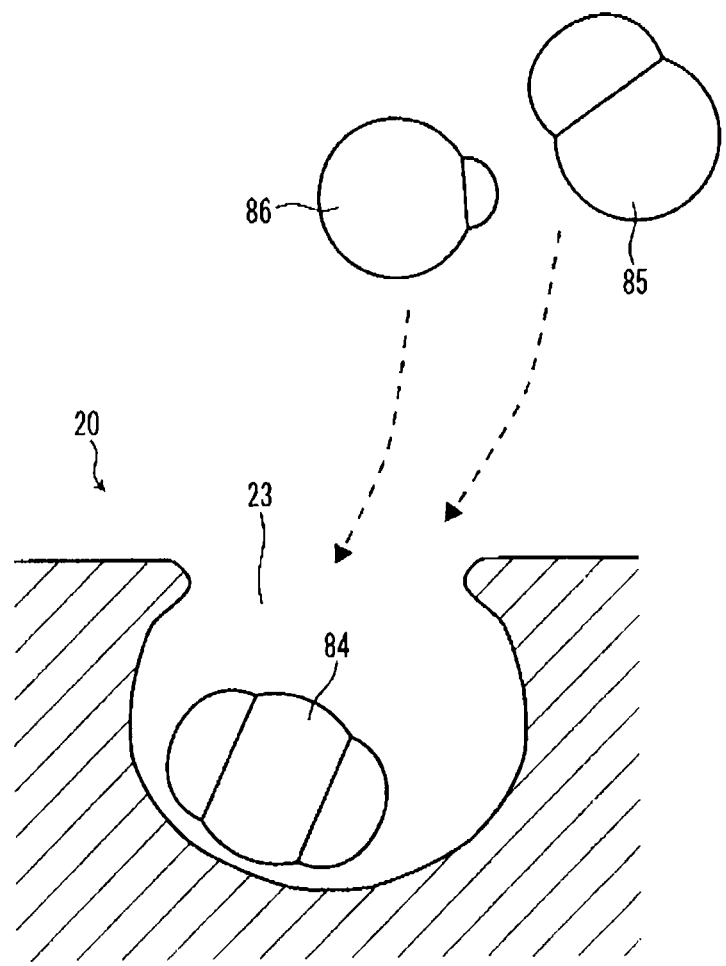
FIG. 3 is a schematic view for explaining adsorption by zeolite of the gas insulation apparatus according to the first embodiment of the present invention, which illustrates a state where $CO_2$ is being adsorbed to the zeolite.
Figure 4:
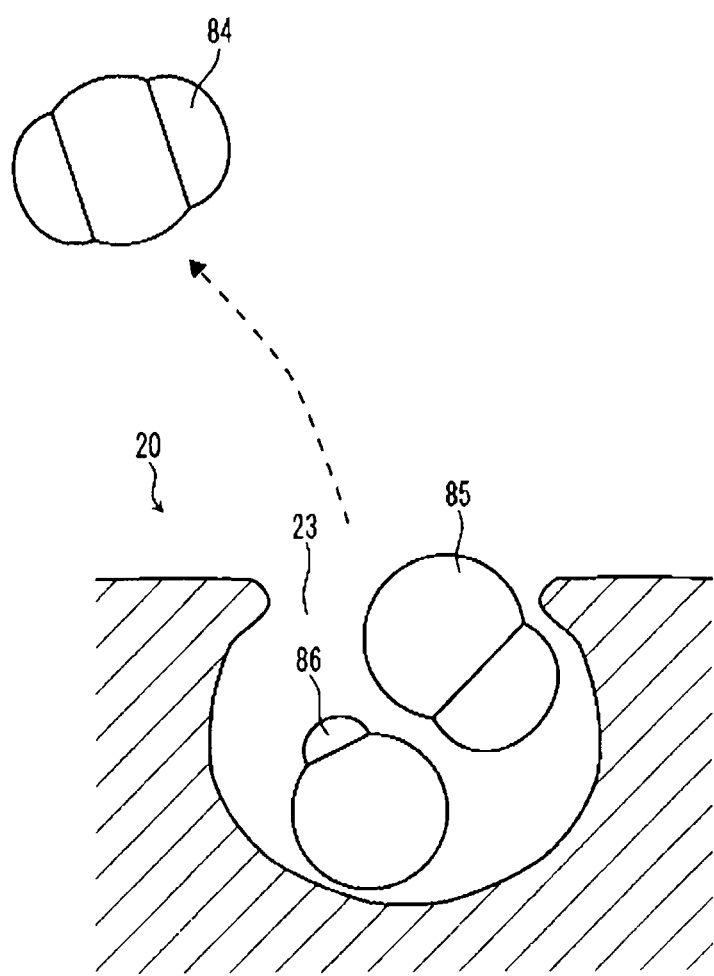
FIG. 4 is a schematic view for explaining adsorption by the zeolite of the gas insulation apparatus according to the first embodiment of the present invention, which illustrates a state where a cracked gas is being adsorbed to the zeolite.

Effects of the gas insulation apparatus (gas circuit breaker) according to the present embodiment will be described with reference to FIGS. 3 and 4. FIG. 3 is a schematic view for explaining adsorption by the zeolite of the gas insulation apparatus according to the first embodiment of the present invention, which illustrates a state where $CO_2$ is being adsorbed to the zeolite. FIG. 4 is a schematic view for explaining adsorption by the zeolite of the gas insulation apparatus according to the first embodiment of the present invention, which illustrates a state where a cracked gas is being adsorbed to the zeolite.

$CO_2$ gas is inferior to $SF_6$ gas but far superior to air in terms of the insulation performance and arc-extinguishing performance. In addition, $CO_2$ gas is far less significant than $SF_6$ gas in the global warming. Thus, according to the present embodiment, it is possible to provide a gas circuit breaker having high insulation performance and arc-extinguishing performance and less significant in the global warming.

When the insulation gas is blown to the arc discharge 81, $CO_2$ gas is dissociated to generate CO gas, as described above. Then, when the concentration of CO gas in the closed vessel 10 is increased, the insulation performance and the arc-extinguishing performance of the gas circuit breaker are deteriorated. However, according to the present embodiment, the CO molecules are adsorbed to the zeolite 20, thereby suppressing the increase in the concentration of CO gas in the closed vessel 10. Thus, it is possible to suppress the insulation performance and the arc-extinguishing performance of the gas circuit breaker from being deteriorated.

Further, as described above, CO gas is generated in the closed vessel 10 in association with the dissociation of $CO_2$ gas, and the amount of $CO_2$ gas in the closed vessel 10 is reduced, with the result that the insulation performance and the arc-extinguishing performance of the gas circuit breaker are deteriorated. However, when the $CO_2$ molecules are adsorbed to the zeolite 20 before use of the gas circuit breaker as in the present embodiment, the generated CO molecules are adsorbed to the zeolite 20, and the $CO_2$ molecules that have been adsorbed to the zeolite 20 are released. Therefore, the increase in the amount of CO gas in the closed vessel 10 can be suppressed, and also the reduction in the amount of $CO_2$ gas can be suppressed. This can suppress the deterioration in the insulation performance and the arc-extinguishing performance of the gas circuit breaker.

As schematically illustrated in FIG. 3, $CO_2$ molecules 84 adsorbed to the zeolite 20 are physically and electrically trapped in a pore 23 of the zeolite 20. The $CO_2$ molecules 84 have non-polar molecular structures and thus are less electrically constrained. On the other hand, CO molecules 85 are more subject to electrical constraint than the $CO_2$ molecules 84 due to their polar molecular structures and are thus easily adsorbed to the zeolite 20. In addition, the CO molecules 85 are physically more easily adsorbed to the zeolite 20 as compared with the $CO_2$ molecules 84 due to their smaller molecular size than the $CO_2$ molecules 84. Thus, as schematically illustrated in FIG. 4, the CO molecules 85 force the $CO_2$ molecules 84 out of the pore 23 and, instead, go into the pore 23. Therefore, according to the present embodiment, "molecular exchanges" are effectively achieved, in which the CO molecules 85 are adsorbed to the zeolite 20 and the $CO_2$ molecules 84 that have been adsorbed to the zeolite 20 are released. This suppresses an increase in the amount of CO gas in the closed vessel 10 and a reduction in the amount of $CO_2$ gas.

The abovementioned "molecular exchanges" are preferably performed in one-to-one correspondence manner in order to maintain the gas filling pressure in the closed vessel 10 constant. To this end, the pore diameter of the zeolite 20 is preferably designed such that one of the $CO_2$ molecules (molecular diameter: about 0.35 nm) 84 and the CO molecules (molecular diameter: about 0.28 nm) 85 can fit into the pore 23. Thus, as in the present embodiment, the average pore diameter of the zeolite 20 is preferably set to a range between 0.2 nm and 0.5 nm. It should be noted that a molecule having a molecular diameter smaller than the average pore diameter can be adsorbed due to thermal motion of the zeolite 20, the $CO_2$ molecules 84 and the CO molecules 85 or the like.

The gas circuit breaker according to the present embodiment has the insulation nozzle 46 made of fluorine resin. This may cause a case where the insulation nozzle 46 is sublimated by the arc discharge 81 to generate fluorine (F) ion, which reacts with water in the closed vessel 10 to generate a hydrogen fluoride (HF) gas. According to the present embodiment, as schematically illustrated in FIG. 4, this HF molecule 86 can be adsorbed to the zeolite 20. The HF molecule 86 has a polar molecular structure and has a smaller molecule diameter than that of the $CO_2$ molecule and is thus more easily adsorbed to the zeolite 20 as compared to the $CO_2$ molecule.

When the average pore diameter of the zeolite 20 is between 0.2 nm and 0.5 nm as in the present embodiment, there may be a case where one CO molecule 85 and one HF molecule 86 are adsorbed to one pore 23 at the same time, as illustrated in FIG. 4.

In the case where the insulation gas is the mixed gas mainly containing $CO_2$ gas, the gas other than $CO_2$ gas is preferably a gas having a non-polar molecular structure, and the gas other than $CO_2$ gas is preferably a gas having a larger molecular diameter than that of $CO_2$ gas. This is because when the gas other than $CO_2$ gas has a polar molecular structure, it can easily force the $CO_2$ molecule that has previously been adsorbed to the zeolite 20 out and, instead, be adsorbed to the zeolite 20. Further, this is because when the gas other than $CO_2$ gas has a smaller molecular diameter than that of $CO_2$ gas, it can easily force the $CO_2$ molecule that has previously been adsorbed to the zeolite 20 out and, instead, be adsorbed to the zeolite 20.

Further, CO gas and HF gas generated by the arc discharge 81 are lighter in weight than $CO_2$ gas constituting the insulation gas, so that they accumulate upward in the closed vessel 10. Thus, when the zeolite case 21 is arranged above the high-voltage unit, the "molecular exchange" is effectively achieved. When the zeolite case 21 is arranged in the flow passage of the insulation gas that has been blown to arc-discharge 81, CO gas and HF gas are easily adsorbed to the zeolite 20 immediately after being generated, thereby maintaining the insulation performance and the arc-extinguishing performance of the gas circuit breaker.

Although the arc discharge 81 has been taken as an example of the discharge in the closed vessel 10 in the above description, CO gas or HF gas is generated also when accidental discharge 82 as illustrated in FIG. 1 occurs. Also in this case, according to the present embodiment, it is possible to suppress a reduction in the insulation performance and the arc-extinguishing performance of the gas circuit breaker.

Second Embodiment

Figure 5:
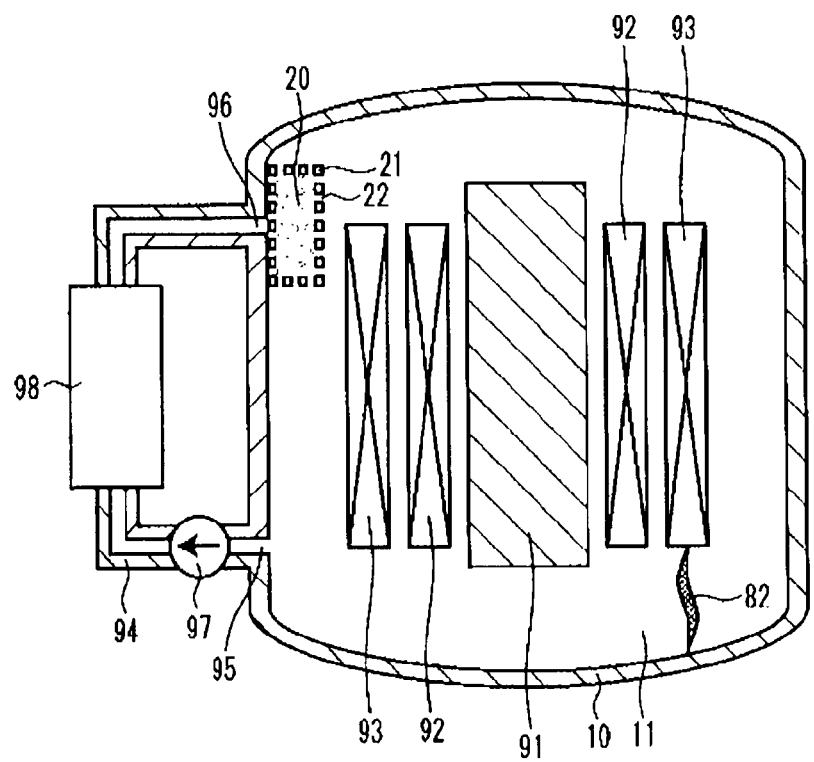
FIG. 5 is a partly schematic cross-sectional view of the gas insulation apparatus (gas insulation transformer) according to a second embodiment of the present invention.

A second embodiment of the gas insulation apparatus according to the present invention will be described with reference to FIG. 5. The gas insulation apparatus according to the present embodiment is a gas insulation transformer.

First, a structure of the gas insulation apparatus (gas insulation transformer) according to the present embodiment will be described with reference to FIG. 5. FIG. 5 is a partly schematic cross-sectional view of the gas insulation apparatus (gas insulation transformer) according to the second embodiment of the present embodiment. The present embodiment is a modification of the first embodiment, so that overlapping descriptions are omitted.

The gas insulation transformer contains the high-voltage unit, zeolite 20 and insulation gas in the closed vessel 10 and has a pipe 94, a blower 97, and a cooler 98.

The high-voltage unit has an iron core 91 and coils 92 and 93 wound around the outer periphery of the iron core 91.

The blower 97 and cooler 98 are arranged outside the closed vessel 10. Insulation gas in the closed vessel 10 is sucked through an inlet 95 by the blower 97, passed through the pipe 94, and flows into the cooler 98 for cooling. The cooled insulation gas then is passed through the pipe 94 and returns to the inside of the closed vessel 10 through an outlet 96. The insulation gas circulates in the gas insulation transformer in this manner.

Although the gas insulation transformer is a static apparatus that does not involve opening/closing of current, it also has a tap switching unit (not illustrated) for switching between the coils 92 and 93 in accordance with a load. At the tap switching time, discharge occurs in the closed vessel 10. Further, due to malfunction such as insulation failure, accidental discharge 82 may occur between the coils 92, 93 and the closed vessel 10.

As described in the first embodiment, such discharge may dissociate the insulation gas to generate a cracked gas such as CO gas to reduce the amount of $CO_2$ gas, resulting in deterioration of the insulation performance of the gas insulation transformer.

In order to cope with this, also in the present embodiment, the zeolite case 21 housing the zeolite 20 is arranged in the closed vessel 10. As illustrated in FIG. 5, when the zeolite case 21 is arranged in the middle of the circulation passage of the insulation gas at a portion in the vicinity of the outlet 96, the cracked gas is effectively adsorbed. Alternatively, the zeolite case 21 may be arranged in the vicinity of the inlet 95 for the same reason. Further, an adsorption chamber housing the zeolite 20 may be arranged in the middle of the pipe 94.

Another Embodiments

The first and the second embodiments are illustrative only, and the present invention is not limited thereto.

Although the gas circuit breaker and gas insulation transformer are taken as examples of the gas insulation apparatus of the present invention in the first and the second embodiments, respectively, the present invention may also be applied to a gas insulation switchgear such as a gas insulation disconnector, a gas insulation arrester, and a gas insulation pipe.

The zeolite 20 need not be a type in which powder thereof is housed in the zeolite case 21 but may be a type using synthetic zeolite film.

What is claimed is:

1. A gas insulation apparatus comprising:
a closed vessel;
a high-voltage unit arranged inside the closed vessel;
an insulation gas containing $CO_2$ filled in the closed vessel; and
a zeolite arranged in the insulation gas,
average pore diameter of the zeolite being in a range between 0.2 nm and 0.5 nm.

2. The gas insulation apparatus according to claim 1, wherein
the insulation gas is a mixed gas mainly containing $CO_2$ and gas having a molecular diameter larger than that of $CO_2$.

3. The gas insulation apparatus according to claim 1, wherein
the zeolite is arranged above the high-voltage unit.

4. The gas insulation apparatus according to claim 1, wherein
the gas insulation apparatus is a switchgear, and
the high-voltage unit comprising:
a fixed contact;
a movable contact arranged opposite to the fixed contact on a same axis as that of the fixed contact so as to contact or separate from the fixed contact, the movable contact being in a conductive state with the fixed contact when contacting the fixed contact and generating arc discharge between itself and the fixed contact when separating from the fixed contact; and an insulation nozzle arranged so as to surround the arc discharge and to blow the insulation gas to the arc discharge.

5. The gas insulation apparatus according to claim 4 wherein
the insulation nozzle contains fluorine resin.

6. The gas insulation apparatus according to claim 4, wherein
the zeolite is arranged at a position in which the insulation gas that has been blown to the arc discharge flows.

7. A gas insulation apparatus comprising:
a closed vessel;
a high-voltage unit arranged inside the closed vessel;
an insulation gas containing $CO_2$ filled in the closed vessel; and
a zeolite arranged in the insulation gas,
$CO_2$ being adsorbed to the zeolite before use of the gas insulation apparatus.

8. The gas insulation apparatus according to claim 7, wherein
the insulation gas is a mixed gas mainly containing $CO_2$ and gas having a molecular diameter larger than that of $CO_2$.

9. The gas insulation apparatus according to claim 7, wherein
the zeolite is arranged above the high-voltage unit.

10. The gas insulation apparatus according to claim 7, wherein
the gas insulation apparatus is a switchgear, and
the high-voltage unit comprising:
a fixed contact;
a movable contact arranged opposite to the fixed contact on a same axis as that of the fixed contact so as to contact or separate from the fixed contact, the movable contact being in a conductive state with the fixed contact when contacting the fixed contact and generating arc discharge between itself and the fixed contact when separating from the fixed contact; and
an insulation nozzle arranged so as to surround the arc discharge and to blow the insulation gas to the arc discharge.

11. The gas insulation apparatus according to claim 10, wherein
the insulation nozzle contains fluorine resin.

12. The gas insulation apparatus according to claim 10, wherein
the zeolite is arranged at a position in which the insulation gas that has been blown to the arc discharge flows.

13. A gas insulation apparatus comprising:
a closed vessel;
a high-voltage unit arranged inside the closed vessel;
an insulation gas containing $CO_2$ filled in the closed vessel; and
a zeolite arranged in the insulation gas,
the insulation gas being a mixed gas mainly containing $CO_2$ and gas other than $CO_2$ having a non-polar molecular structure.

14. The gas insulation apparatus according to claim 13, wherein
the insulation gas is a mixed gas mainly containing $CO_2$ and gas having a molecular diameter larger than that of $CO_2$.

15. The gas insulation apparatus according to claim 13, wherein
the zeolite is arranged above the high-voltage unit.

16. The gas insulation apparatus according to claim 13, wherein
the gas insulation apparatus is a switchgear, and
the high-voltage unit comprising:
a fixed contact;
a movable contact arranged opposite to the fixed contact on a same axis as that of the fixed contact so as to contact or separate from the fixed contact, the movable contact being in a conductive state with the fixed contact when contacting the fixed contact and generating arc discharge between itself and the fixed contact when separating from the fixed contact; and
an insulation nozzle arranged so as to surround the arc discharge and to blow the insulation gas to the arc discharge.

17. The gas insulation apparatus according to claim 16, wherein
the insulation nozzle contains fluorine resin.

18. The gas insulation apparatus according to claim 16, wherein
the zeolite is arranged at a position in which the insulation gas that has been blown to the arc discharge flows.

19. A gas insulation apparatus comprising:
a closed vessel;
a high-voltage unit arranged inside the closed vessel;
an insulation gas containing $CO_2$ filled in the closed vessel;
a zeolite arranged in the insulation gas; and
an oxidation catalyst arranged in the insulation gas so as to oxidize CO to $CO_2$.

20. The gas insulation apparatus according to claim 19, wherein
the insulation gas is a mixed gas mainly containing $CO_2$ and gas having a molecular diameter larger than that of $CO_2$.

21. The gas insulation apparatus according to claim 19, wherein
the zeolite is arranged above the high-voltage unit.

22. The gas insulation apparatus according to claim 19, wherein
the gas insulation apparatus is a switchgear, and
the high-voltage unit comprising:
a fixed contact;
a movable contact arranged opposite to the fixed contact on a same axis as that of the fixed contact so as to contact or separate from the fixed contact, the movable contact being in a conductive state with the fixed contact when contacting the fixed contact and generating arc discharge between itself and the fixed contact when separating from the fixed contact; and
an insulation nozzle arranged so as to surround the arc discharge and to blow the insulation gas to the arc discharge.

23. The gas insulation apparatus according to claim 22, wherein
the insulation nozzle contains fluorine resin.

24. The gas insulation apparatus according to claim 22, wherein
the zeolite is arranged at a position in which the insulation gas that has been blown to the arc discharge flows.

* * * * *